(12) United States Patent
Bernier

(10) Patent No.: US 6,977,575 B2
(45) Date of Patent: Dec. 20, 2005

(54) FLEXIBLE AVERAGING RESISTANCE TEMPERATURE DETECTOR

(75) Inventor: Pete Bernier, Minneapolis, MN (US)

(73) Assignee: RTD Company, Ham Lake, MN (US)

( * ) Notice: Subject to any disclaimer, the term of this patent is extended or adjusted under 35 U.S.C. 154(b) by 0 days.

(21) Appl. No.: 10/686,942

(22) Filed: Oct. 16, 2003

(65) Prior Publication Data

US 2004/0233034 A1    Nov. 25, 2004

Related U.S. Application Data

(60) Provisional application No. 60/472,972, filed on May 22, 2003.

(51) Int. Cl.[7] ............................................... H01C 3/04
(52) U.S. Cl. ............................. 338/25; 338/26; 338/28
(58) Field of Search ............................... 338/25, 26, 28

(56) References Cited

U.S. PATENT DOCUMENTS

| | | | | |
|---|---|---|---|---|
| 2,749,753 A | * | 6/1956 | Adams | 374/183 |
| 2,758,294 A | * | 8/1956 | Duncan | 340/589 |
| 2,802,925 A | * | 8/1957 | Von Seelen et al. | 338/28 |
| RE24,436 E | * | 2/1958 | Jacobson et al. | 338/26 |
| 4,553,023 A | * | 11/1985 | Jameson et al. | 392/472 |
| 4,977,385 A | * | 12/1990 | McQueen | 338/24 |
| 5,221,916 A | * | 6/1993 | McQueen | 338/24 |
| 5,460,041 A | * | 10/1995 | Andes et al. | 73/335.08 |
| 5,749,656 A | * | 5/1998 | Boehm et al. | 374/185 |
| 5,959,524 A | * | 9/1999 | Wienand et al. | 338/28 |
| 5,999,081 A | * | 12/1999 | Hannigan et al. | 338/28 |
| 6,698,922 B2 | * | 3/2004 | Adachi et al. | 374/208 |
| 6,738,566 B2 | * | 5/2004 | Pagnella | 392/472 |
| 2002/0048312 A1 | * | 4/2002 | Schurr et al. | 374/208 |
| 2003/0050634 A1 | * | 3/2003 | Ellman et al. | 606/41 |

* cited by examiner

*Primary Examiner*—Karl D. Easthom
(74) *Attorney, Agent, or Firm*—Schwegman, Lundberg, Woessner & Kluth P.A.

(57) ABSTRACT

A temperature sensor. The sensor comprises a wire comprising a resistance temperature detector (RTD) sensing material wrapped around a flexible insulated metal core wire to form an assembly. A first end of the sensing wire is electrically connected to a first end of the core wire. The second end of the core wire provides a first lead, and an insulated lead wire is electrically connected to a second end of the sensing wire to provide a second lead. Shrink tubing encapsulates the assembly.

21 Claims, 5 Drawing Sheets

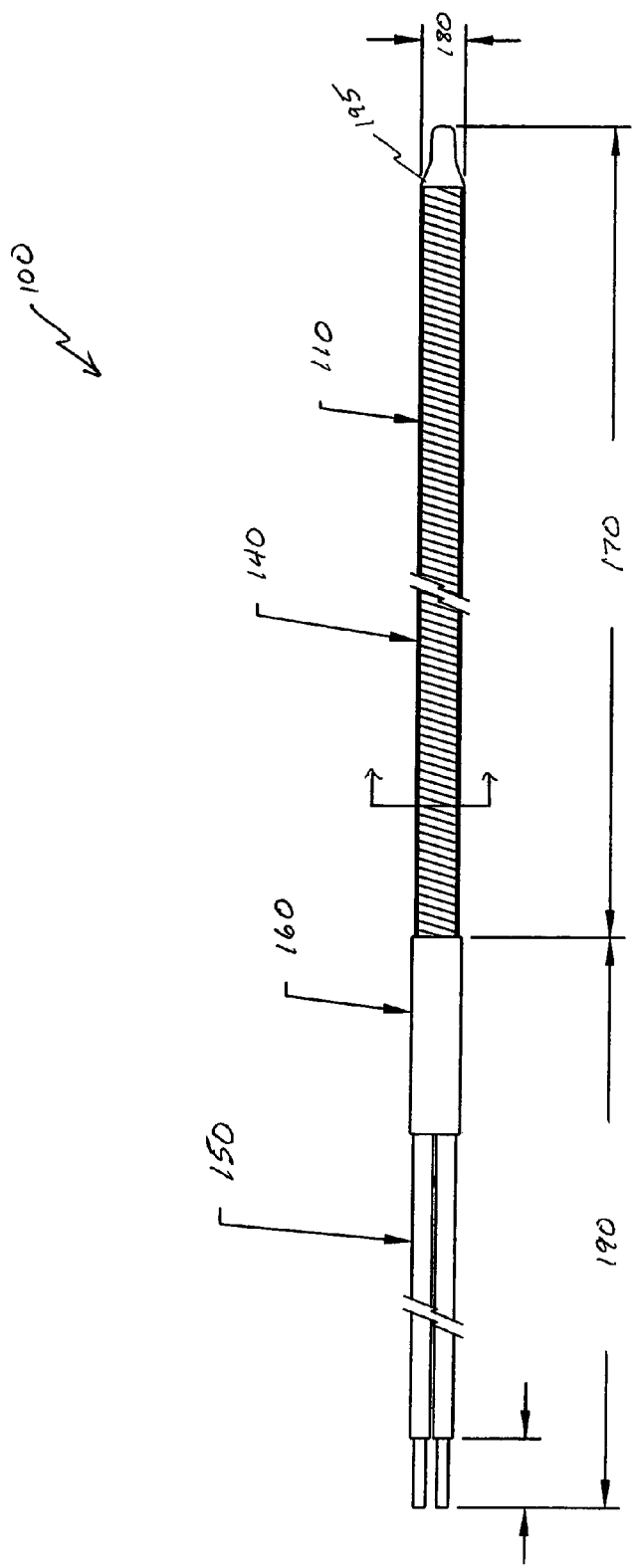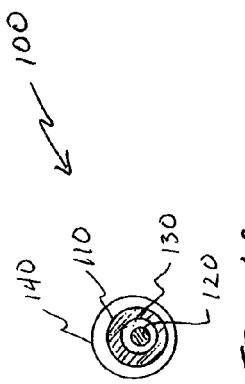

FLEXIBLE AVERAGING RESISTANCE TEMPERATURE DETECTOR

CROSS-REFERENCE TO RELATED APPLICATION(S)

This application claims the benefit under 35 U.S.C. §119(e) of U.S. Provisional Patent Application Ser. No. 60/472,972, filed May 22, 2003.

TECHNICAL FIELD

This patent application relates to temperature sensors, and in particular, to a flexible resistance temperature sensor.

BACKGROUND

A resistance temperature detector (RTD) is a sensing element that works on the principle of the temperature coefficient of the electrical resistance of metals. These types of sensors provide a change in resistance proportional to a change in temperature. A known electrical current passed through the element produces a voltage drop across the sensing element. This voltage drop can then be measured by a calibrated device to determine the temperature change.

Generally, a RTD is used to monitor a temperature at a point. If a temperature reading is needed over an area in a device, multiple sensors are used resulting in a complex system that adds cost and size to the device.

What is needed is a RTD that monitors temperature beyond a single point and has a small form factor.

SUMMARY

This document discusses materials and techniques used to create a flexible resistance temperature detector (RTD) of small form factor.

The flexible temperature sensor comprises a wire comprising a resistance temperature detector (RTD) sensing material wrapped around a second flexible insulated core wire to form an assembly. This core wire acts as a mandrel for the winding. A first end of the sensing wire is electrically connected to a first end of the core wire and the second end of the core wire provides a first lead for the sensor. A third wire, an insulated lead wire, is electrically connected to a second end of the sensing wire to provide a second lead. Insulating shrink tubing encapsulates the assembly.

A method for producing the sensor includes wrapping a first wire comprising a RTD sensing material around a flexible insulated core wire to create a wire wrapped assembly. A first end of the sensing wire is electrically connected to a first end of the core wire. A first lead for the sensor is provided by electrically connecting an insulated lead wire to the second end of the sensing wire and using the second of the core wire as a second lead. The wire wrapped assembly is placed into a heat shrinkable polymer material and sealed by heating the polymer material.

This summary is intended to provide an overview of the subject matter of the present application. It is not intended to provide an exclusive or exhaustive explanation of the invention. The detailed description is included to provide further information about the subject matter of the present patent application.

BRIEF DESCRIPTION OF THE DRAWINGS

In the drawings like numerals refer to like components throughout the several views.

FIG. 1A is a drawing of one embodiment of the resistance temperature detector (RTD) sensor.

FIG. 1B is a cross-sectional drawing of one embodiment of the temperature sensor.

DETAILED DESCRIPTION

Figure 2:
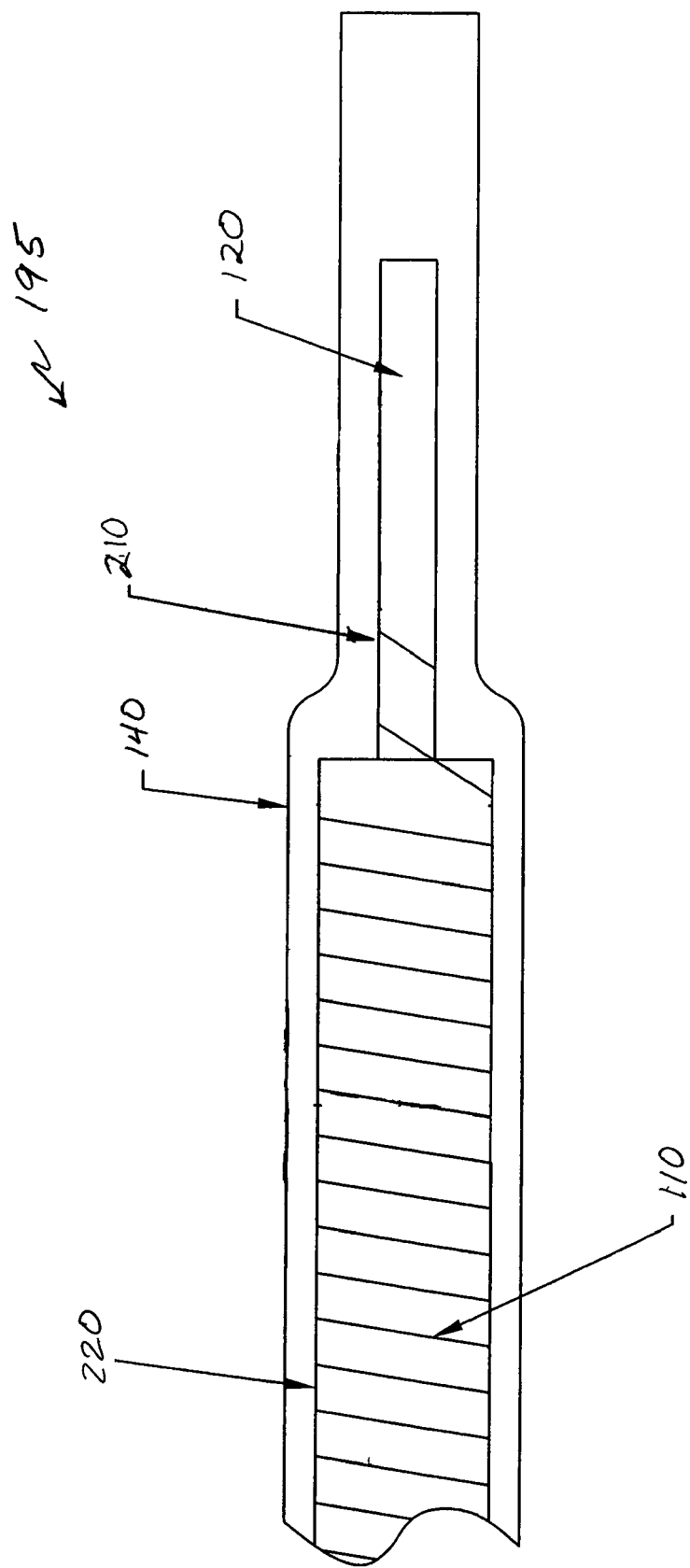
FIG. 2 is a drawing showing the tip of the temperature sensor.

In the following detailed description, reference is made to the accompanying drawings which form a part hereof, and specific embodiments in which the invention may be practiced are shown by way of illustration. It is to be understood that other embodiments may be used and structural changes may be made without departing from the scope of the present invention.

As stated previously, the present application is concerned with materials and techniques used to create a flexible resistance temperature detector (RTD) of small form factor. FIG. 1A shows one embodiment of a sensor 100. In the embodiment a sensing element 110 is wound around a flexible core wire 120. In one embodiment, the sensing element includes platinum. In another embodiment, the sensing element includes nickel. In another embodiment, the sensing element includes copper. In a further embodiment, the sensing element includes a nickel-iron alloy. One of ordinary skill in the art would understand, upon reading and comprehending this disclosure, that various embodiments of the sensing element include various combinations of the metals.

The core wire 120 can be seen in the cross-sectional view shown in FIG. 1B. The core wire 120 serves as a mandrel for the winding and provides support for the sensing element 110. In one embodiment, the core wire 120 is insulated. The sensing element 110 is electrically connected to one end of the core wire 120. The insulation layer 130 is also shown in the cross-sectional view of FIG. 1B. In another embodiment the core wire comprises braided strands of conductive material and the insulating layer comprises woven fiber glass insulation.

Insulated wire leads 150 extend from the temperature sensor 100 in FIG. 1A. In one embodiment, one lead is attached to the sensing element by brazing or soldering and the second lead is the insulated wire comprising the flexible core. In another embodiment, the sensing element is wound so that both ends of the sensing element are available at one end of the sensor and the ends are brazed or soldered to both leads 150. In one embodiment the leads are 22 AWG. A heat shrinkable polymer tubing 140 is placed over the temperature sensor element winding and core assembly, and the assembly is sealed by heating the tubing 140. In one embodiment, the shrink tubing 140 is fluorinated ethylene polypropylene (FEP) shrink tubing. In another embodiment, the shrink tubing 140 is polytetrafluoroethylene (PTFE). The tip of the sensor 195 is formed from the shrink tubing 140.

FIG. 2 shows an embodiment of the sensor tip 195. A connection 210 between the core wire 120 and the sensing element wire 110 is made by soldering the wires 110, 120. In the embodiment shown in the figure, the length of the connection 210 is about two to three diameters of the wire 110. Heat shrinkable tubing 140 is then used to seal the tip 195.

Because the RTD is flexible, it can be wrapped around a hose or other body and measure an average temperature over the length of the body. Thus the sensor can be used to measure temperature of any fluid in such a body. One use of the sensor is with a hose used in hot melt glue applicator systems. The sensor is wound around a hollow core in close proximity to heating elements of the glue applicator system. The glue system monitors the sensors and then controls the heating elements based on the sensor's reading. Tight control of the temperature is needed to insure that the glue flows without curing too quickly.

The length of the sensor is not limited, and sensitive lengths 170 from one inch to eighty feet are within contemplation of this sensor. In one embodiment the non-sensitive length 190 is about twenty-three inches and the sensitive length is about thirty-two inches. The height 180 of the sensor is small and thus the sensor does not significantly impact the size of the device. In one embodiment, the height 180 is about one-twentieth of an inch.

Figure 3:
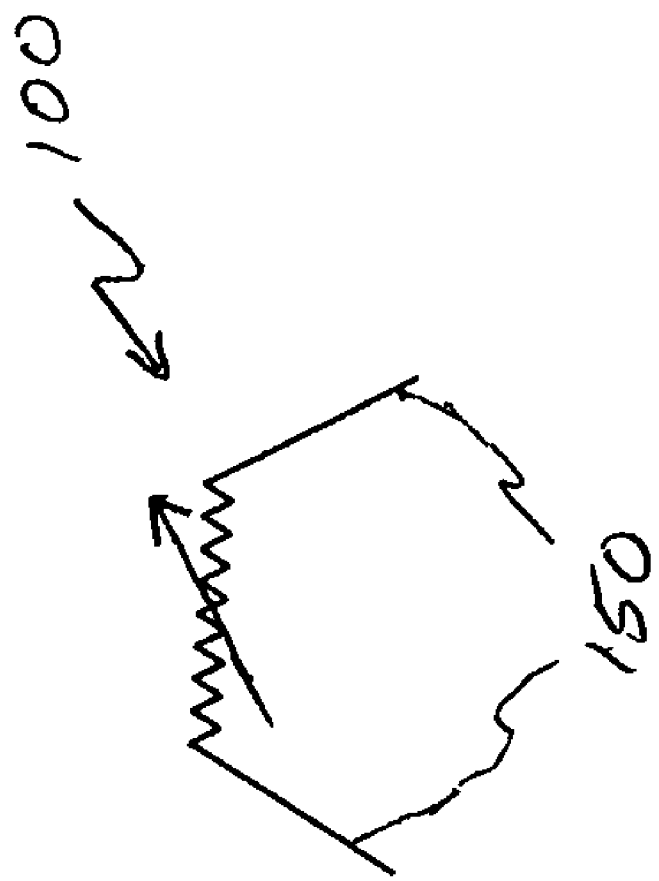
FIG. 3 is a drawing showing the electrical circuit equivalent of the temperature sensor.

FIG. 3 shows an electrical equivalent of the sensor 100. It is a resistance varying with temperature available between leads 150. The resistance of the temperature sensor will also depend on the gauge of the wire and the length of the sensing element used. A thicker gauge wire will result in a lower net resistance than a thinner gauge wire of equal length. By using different combinations of lengths and thicknesses, a desired sensitive length of a sensor can be tailored to a desired resistance for the sensor.

Figure 4:
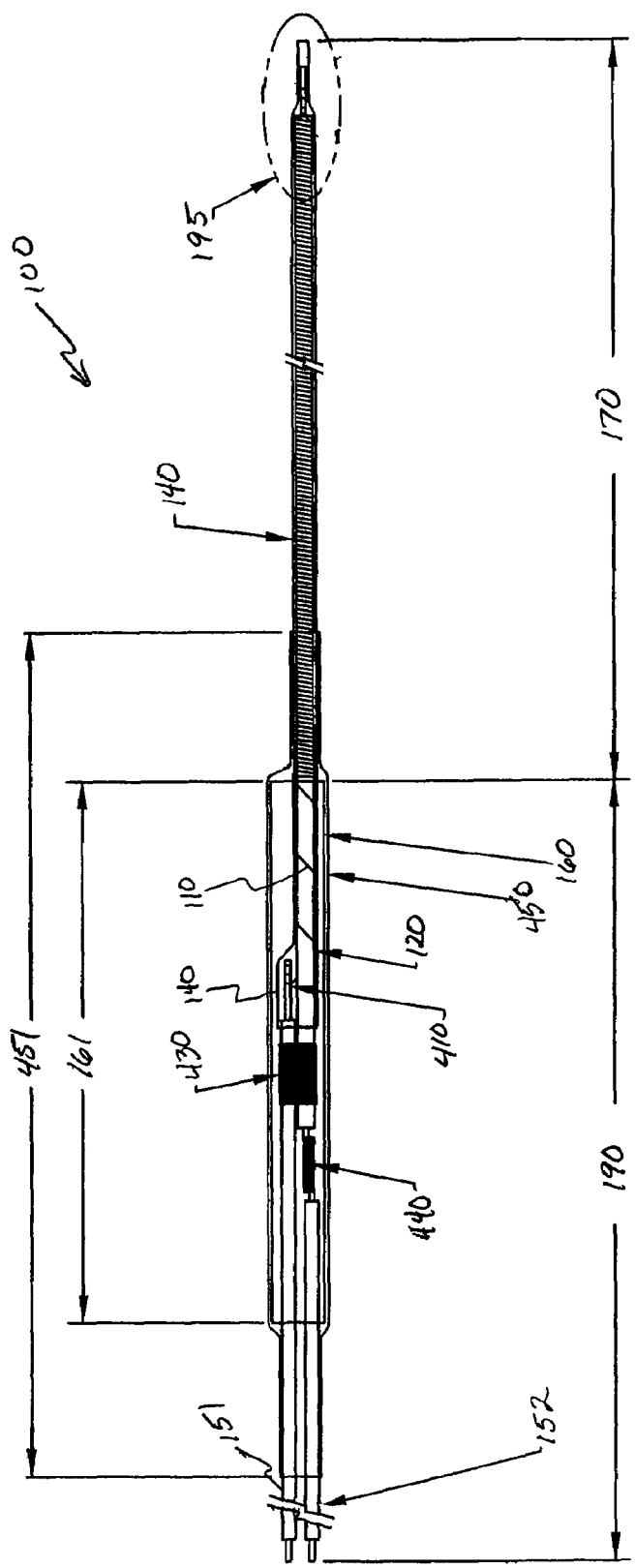
FIG. 4 is a drawing showing another embodiment of the temperature sensor.

FIG. 4 shows another embodiment of the sensor 100. The figure shows that heat shrink polymer tubing 140 is placed over the connection 410 of the sensing element wire 110 to the lead wire 151. A banding strap 430 is placed over the lead wire 151 and the core wire 120 to provide mechanical strain relief. In one embodiment, the banding strap 430 includes brass. In another embodiment, the banding strap 430 includes steel. A second lead wire 152 is connected to the core wire 120. In one embodiment, the lead wires 151, 152 are connected to the sensing element wire 110 and core wire 120 by soldering. In another embodiment, the connections 410, 440 are made by brazing. In another embodiment, the leads 151, 152 withstand a five pound pull-force without separating from the assembly. In a further embodiment, a second banding strap (not shown) is placed around the two lead wires 151, 152 to the left of the lead wire connections to provide additional mechanical strain relief.

Heat shrinkable polymer tubing 160 is used to cover the banding strap 430 and lead wire connections 410, 440. In one embodiment of the length 161 of the tubing 160, the length 161 is about two and one quarter inches. In one embodiment of the material comprising the tubing 160, the heat shrink tubing 160 is FEP. In another embodiment, the heat shrink tubing is PTFE. A second layer of heat shrinkable polymer tubing 450 is then placed over the sensor beyond the ends of the first layer of heat shrinkable tubing 160 to a point over the lead wires 151, 152. In one embodiment of the length 451 of the tubing, the length 451 is about three and one half inches. In one embodiment of the material comprising the tubing 450, the tubing 450 is PTFE.

Figure 5:
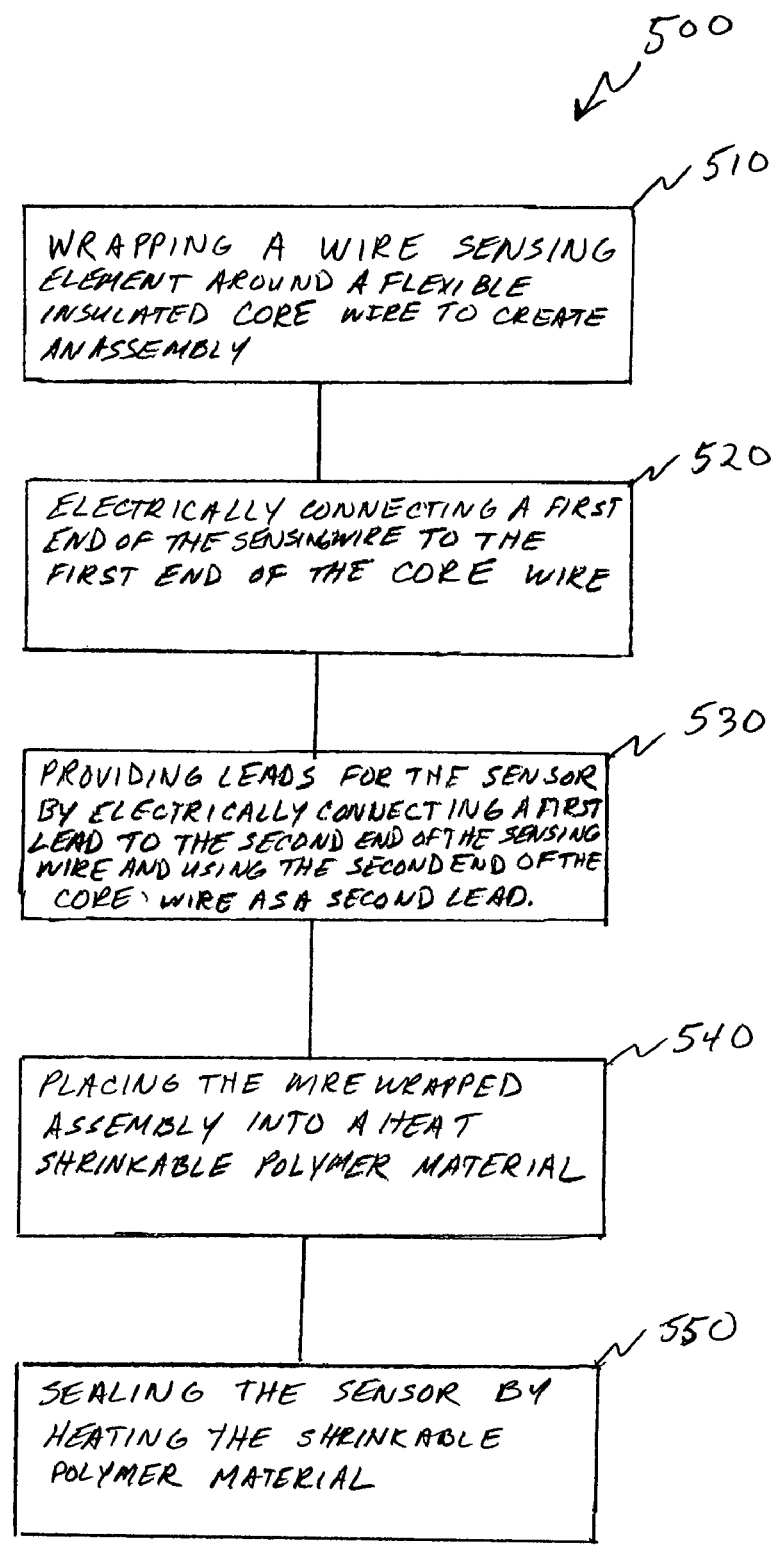
FIG. 5 is a flowchart of one embodiment of a method of forming the sensor.

FIG. 5 shows a flowchart of one embodiment of a method 500 of forming the sensor 100. At 510, a wire sensing element 110 is wrapped around a flexible insulated core wire, creating a wire wrapped assembly. At 520, a first end of the sensing wire is electrically connected to the first end of the core wire 120. At 530, leads 150 are provided for the temperature sensor by electrically connecting a first insulated lead to the second end of the sensing wire and using the second of the core wire as a second lead of the temperature sensor. At 540, the wire wrapped assembly is placed into a heat shrinkable polymer material 140. At 550, the sensor 100 is sealed by heating the polymer material 140.

Although specific examples have been illustrated and described herein, it will be appreciated by those of ordinary skill in the art that any arrangement calculated to achieve the same purpose could be substituted for the specific example shown. This application is intended to cover any adaptations or variations of the present invention. Therefore, it is intended that this invention be limited only by the claims and their legal equivalents.

What is claimed is:

1. A temperature sensor comprising:
a wire comprising a resistance temperature detector (RTD) sensing material wrapped in a plurality of adjacent windings around a flexible core wire to form distributed adjacent windings insulated from the core wire and including separation between adjacent windings to form a flexible assembly, the wire including a first end and a second end and the core wire including a first core end and a second core end, the first end electrically connected to the first core end, the second core end providing a first lead;
an insulated lead wire electrically connected to the second end of the wire to provide a second lead;
a first layer of heat shrinkable tubing encapsulating at least the first end and the first core end; and
a second layer of heat shrinkable tubing covering at least a portion of the first lead and second lead, wherein the first layer extends beyond the second layer.

2. The sensor of claim 1, wherein the height of the sensor is about one-twentieth of an inch.

3. The temperature sensor of claim 2, wherein the core wire includes braided strands of conductive metal.

4. The temperature sensor of claim 3, wherein the core wire includes woven fiber glass insulation over the braided strands.

5. The temperature sensor of claim 4, wherein the wire comprising a sensing material includes one, or a combination of platinum, nickel, a nickel-iron alloy, and copper.

6. The temperature sensor of claim 5, wherein the electrical connections to the wires are made using soldering or brazing.

7. The temperature sensor of claim 6, wherein the sensor further comprises a strain relieving banding strap over the core wire and the second lead wire.

8. The temperature sensor of claim 7, wherein the banding strap includes brass.

9. The temperature sensor of claim 7, wherein the banding strap includes steel.

10. The temperature sensor of claim 7, wherein the banding strap is crimped around the core wire and the insulated lead wire.

11. The temperature sensor of claim 10, wherein the first and second lead wires exit the sensor at the same end.

12. The temperature sensor of claim 11, wherein an insulated lead wire is electrically connected to the second core end to provide the first lead.

13. The temperature sensor of claim 12, wherein a second banding strap is placed around the first and second lead wires.

14. The temperature sensor of claim 12, wherein the insulated wire leads withstand a five-pound pull force without separating from the assembly.

15. A temperature sensor produced by the method comprising:
   wrapping a plurality of adjacent windings of a first wire comprising a resistance temperature detector (RTD) sensing material around a flexible core wire to form distributed adjacent windings insulated from the core wire and including separation between adjacent windings, creating a flexible wire wrapped assembly, the first wire including a first end and a second end and the core wire including a first core end and a second core end;
   electrically connecting the first end to the first core end;
   providing leads for the temperature sensor by electrically connecting a first insulated lead to the second end and using the second core end as a second lead of the temperature sensor;
   placing the wire wrapped assembly into a heat shrinkable polymer material, including providing a first and second layer of heat shrinkable tubing, wherein the second layer extends beyond ends of the first layer; and
   sealing at least the first end and the first core end of the temperature sensor by heating the polymer material.

16. The method of claim 15, wherein providing leads includes electrically connecting a second insulated lead to the second core end.

17. The method of claim 16, wherein the method further includes providing mechanical strain relief for the first and second leads.

18. The method of claim 15, wherein the first layer is heated before the assembly is placed into the second layer.

19. The method of claim 15, wherein electrically connecting to the sensing wire includes soldering or brazing.

20. A temperature sensor produced by the method comprising:
   wrapping a first wire comprising a resistance temperature detector (RTD) sensing material around a flexible core wire, creating a wire wrapped assembly;
   electrically connecting a first end to the first core end;
   providing leads for the temperature sensor by electrically connecting a first insulated lead to the second end and using the second end as a second lead of the temperature sensor;
   placing the wire wrapped assembly into a heat shrinkable polymer material, including providing a first and second layer of heat shrinkable tubing, wherein the second layer extends beyond ends of the first layer; and
   sealing the temperature sensor by heating the polymer material.

21. The temperature sensor of claim 20, wherein the first layer is heated before the assembly is placed into the second layer.

* * * * *